(12) United States Patent
Cloud et al.

(10) Patent No.: US 8,200,046 B2
(45) Date of Patent: Jun. 12, 2012

(54) METHOD AND SYSTEM FOR ENHANCING SHORT WAVE INFRARED IMAGES USING SUPER RESOLUTION (SR) AND LOCAL AREA PROCESSING (LAP) TECHNIQUES

(75) Inventors: Eugene L. Cloud, Orlando, FL (US); Harry C. Lee, Maitland, FL (US); Richard A. Manville, Winter Spring, FL (US)

(73) Assignee: DRS RSTA, Inc., Dallas, TX (US)

( * ) Notice: Subject to any disclaimer, the term of this patent is extended or adjusted under 35 U.S.C. 154(b) by 1097 days.

(21) Appl. No.: 12/101,636

(22) Filed: Apr. 11, 2008

(65) Prior Publication Data

US 2009/0257683 A1 Oct. 15, 2009

(51) Int. Cl.
*G06K 9/32* (2006.01)
(52) U.S. Cl. .......... 382/299; 382/254; 382/276
(58) Field of Classification Search .......... 345/589; 348/297; 375/E7.011, E7.182; 382/205, 382/254, 274, 276, 282, 284, 294, 299
See application file for complete search history.

(56) References Cited

U.S. PATENT DOCUMENTS

| | | | |
|---|---|---|---|
| 6,434,280 B1 | 8/2002 | Peleg | |
| 6,961,481 B2 | 11/2005 | Lee | |
| 7,003,177 B1 | 2/2006 | Mendlovic | |
| 2004/0008269 A1 | 1/2004 | Zomet | |
| 2004/0170340 A1 | 9/2004 | Tipping | |
| 2004/0218834 A1 | 11/2004 | Bishop | |
| 2005/0002546 A1* | 1/2005 | Florent et al. | 382/128 |
| 2005/0057687 A1 | 3/2005 | Irani | |
| 2005/0201637 A1 | 9/2005 | Schuler | |
| 2005/0244081 A1 | 11/2005 | Zhou | |
| 2005/0280714 A1 | 12/2005 | Freeman | |
| 2006/0043296 A1 | 3/2006 | Mian | |
| 2006/0126952 A1* | 6/2006 | Suzuki et al. | 382/233 |
| 2008/0002914 A1 | 1/2008 | Vincent et al. | |

OTHER PUBLICATIONS

Oliver Rockinger, Thomas Fechner, "Pixel-Level Image Fusion: The Case of Image Sequences", 1998, Autonomous Systems Lab Intelligent Systems Group Daimler Benz AG, [online], [Retrieved on Nov. 18, 2011]. Retrieved from the Internet:<URL:http://bluecoat-01/?cfru=aHR0cDovL2NpdGVzZWVyeC5pc3QucHN1LmVkdS92aWV3ZG9jL2Rvd25sb2FkP2RvaT0xMC4xLjEuNDIuMzkxOCZyZXA9.*

International Search Report dated Jul. 2, 2009 corresponding to PCT/US09/38340.

* cited by examiner

*Primary Examiner* — Gregory F Cunningham
(74) *Attorney, Agent, or Firm* — Kilpatrick Townsend & Stockton LLP

(57) ABSTRACT

A high resolution image of a scene or object is generated by collecting a plurality of images, enhancing the plurality of images to produce a sequence of enhanced images, registering the sequence of enhanced images, accumulating the intensities of the registered sequence of enhanced images to produce a composite image, and enhancing the composite image.

21 Claims, 7 Drawing Sheets

METHOD AND SYSTEM FOR ENHANCING SHORT WAVE INFRARED IMAGES USING SUPER RESOLUTION (SR) AND LOCAL AREA PROCESSING (LAP) TECHNIQUES

FIELD OF THE INVENTION

The present invention relates, generally, to image processing and, more particularly, to enhancing short wave infrared (SWIR) images using super resolution (SR) and local area processing (LAP) techniques.

BACKGROUND OF THE INVENTION

Historically, reconnaissance information has provided important information used in planning military operations. For example, prior to the advent of photography, scouts would be sent out to collect information regarding natural resources, such as lakes and rivers, enemy troop information, and the like. With the advent of photography, these scouts would provide reconnaissance information by capturing a scene of enemy installations, battlefields, and the like, using photographs.

As technology advances, new methods have been devised for collecting reconnaissance information. For example, reconnaissance planes, manned or remotely controlled, or satellites are commonly used to capture a scene in the form of image data for reconnaissance purposes. As the scene may need to be captured at any time of the day or night, in lieu of or in addition to conventional photographic techniques, it may be preferable to utilize infrared detectors and the like.

Infrared (IR) images are ideally suited for producing images of scenes captured under low light intensity. However, IR images are not always optimal. IR images are often plagued by poor contrast, which can be challenging for users trying to understand situational objects within the captured scene and make corresponding tactical decisions, for example. Typically, a simple summation of a sequence of short wave infrared images (SWIR) tends to provide some improvement in the signal-to-noise ratio of the images. However, this summation generally blurs the images and consequently has not proven to be an optimal solution.

In addition, many low-cost visible and thermal detectors or sensors spatially or electronically undersample an image. Undersampling can result in aliased images of the scene which may dilute the high-frequency components in the images. Consequently, subtle detailed information (high-frequency components) can be lost in the images.

Therefore, there is a need to remedy the problems noted above and others previously experienced for enhancing low-intensity IR images for use, in particular SWIR images, in target discrimination and identification, as well as reducing noise and improving image interpretability.

SUMMARY OF THE INVENTION

The foregoing problems are solved and a technical advance is achieved by methods, systems and articles of manufacture consistent with the present invention, which provide enhanced short wave infrared images using super resolution (SR) and local area (LAP) processing techniques.

In accordance with methods consistent with the present invention, a method for generating a high resolution image of a scene or object is provided. The method steps comprise: collecting a plurality of images, enhancing the plurality of images to produce a sequence of enhanced images, registering the sequence of enhanced images, accumulating the intensities of the registered sequence of enhanced images to produce a composite image, and enhancing the composite image.

In accordance with systems consistent with the present invention, an image processing system is provided. The system comprises a memory and a processing unit coupled to the memory wherein the processing unit is configured to execute the above noted method steps.

In accordance with articles of manufacture consistent with the present invention, there is provided a computer-readable medium containing a program adapted to cause a data processing system to execute the above-noted method steps. In this regard, the computer-readable medium may be a computer-readable medium, such as solid-state memory, magnetic memory such as a magnetic disk, optical memory such as an optical disk, or a computer-readable transmission medium, such as a modulated wave (such as radio frequency, audio frequency or optical frequency modulated waves) or a modulated downloadable bit stream that can be received by a computer via a network or a via a wireless connection.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE PRESENTLY PREFERRED EMBODIMENTS

Reference will now be made in detail to an implementation consistent with the present invention as illustrated in the accompanying drawings. Wherever possible, the same reference numbers will be used throughout the drawings and the following description to refer to the same or like parts. As would be understood to one of ordinary skill in the art, certain components or elements for enhancing interpretability of laser illuminated images are not shown in the figures or specifically noted herein to avoid obscuring the invention.

Figure 1:
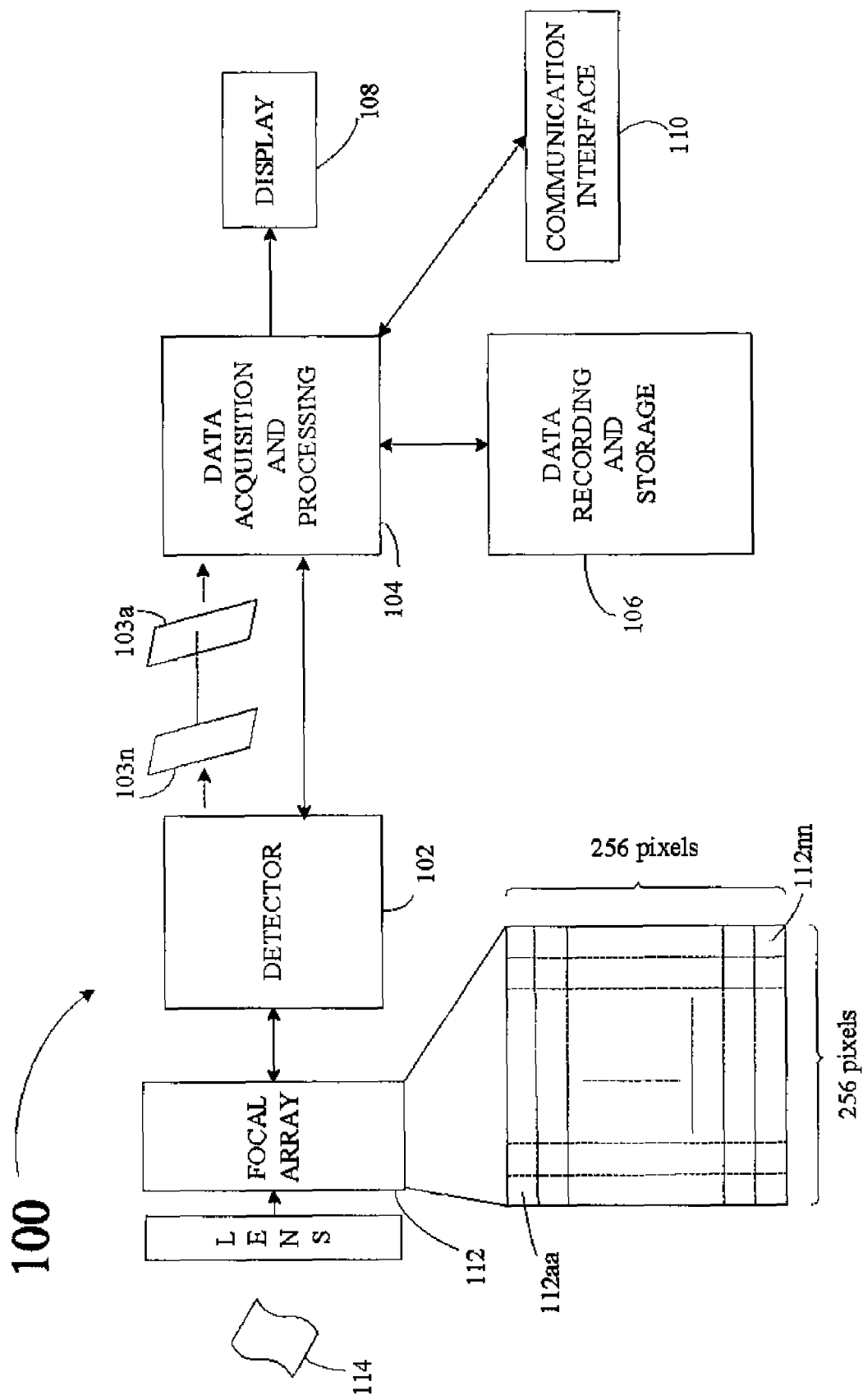
FIG. 1 is a block diagram illustrating one embodiment of an imaging system for capturing and enhancing low intensity thermal or infrared images in accordance with the present invention.

Referring to FIG. 1, an embodiment of an image processing or imaging system 100 is illustrated in accordance with the present invention. The imaging system 100 includes an image sensing or detection unit 102, an image acquisition and processing unit 104, a data recording and storage unit 106, a display unit 108, and a communication interface unit 110. Alternately, one or more of these devices, such as the display unit 108, may be incorporated into the image acquisition and processing unit 104, hereafter referred to as the processing unit 104.

The detection unit 102, hereafter referred to as the detector, comprises a focal plane array of pixels or photodetectors suitable for detecting an input image (e.g. 103a), such as an infrared image, during an integration and acquisition period, which may be triggered by the image acquisition and processing unit 104. The integration and acquisition period is described in more detail below. In the implementation shown, the detector 102 detects and outputs a sequence of input images 103a-103n, as directed by the image acquisition and processing unit 104.

The detector 102 may include a lens that focuses light emitted or reflected from an object or scene 114 onto a focal plane array 112 of pixels 112aa-112nn. During each integration acquisition period or frame, each of the pixels 112aa-112nn accumulates a respective portion of the light from the object or scene and generates a corresponding signal or charge based on the intensity of the light. The electrical signals or charges generated by the pixels 112aa-112nn collectively represent an input image 103a-103n which is output by the detector 102 to the processor 104. For purposes of illustration and clarity in the discussion, each input image 103a-103n is assumed to correspond to 256 by 256 pixels, referenced as 112aa-112nn in FIG. 1.

Figure 2:
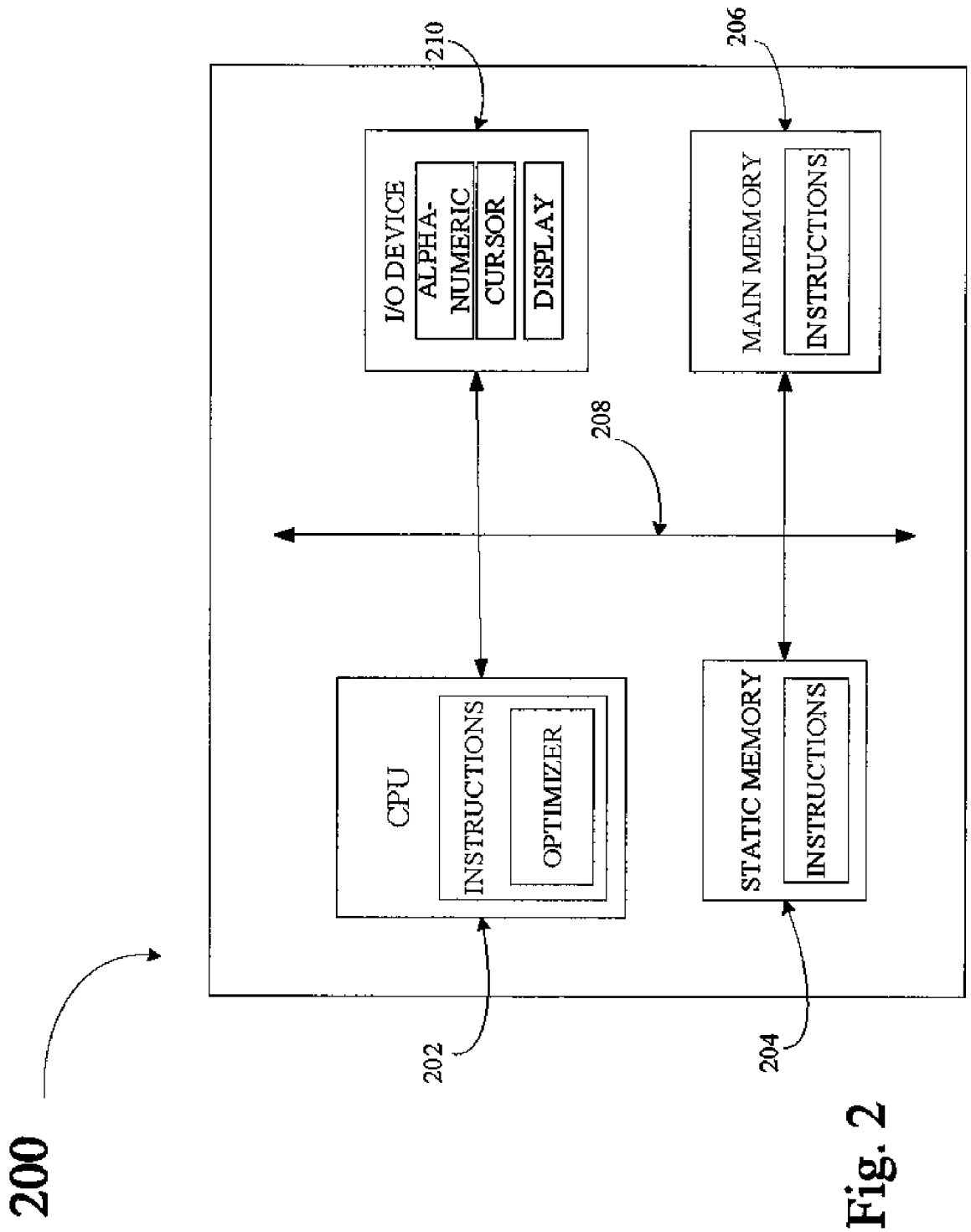
FIG. 2 is a block diagram illustrating the data acquisition and processing unit of FIG. 1.

The data acquisition and processing unit 104, hereafter referred to as the processor, can be hard-wired circuits or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). As illustrated in FIG. 2, the processor 104 can include a central processing unit (CPU) 202, a static memory 204 and a main memory 206 that can communicate with each other via bus 208. Additionally, the processor 104 may include an input/output device 210 that may have an alphanumeric device, such as a keyboard, a cursor control device, such as a mouse, and a video display device, such as a liquid crystal display (LCD), an organic light emitting diode (OLED), a flat panel display, a solid state display, or a cathode ray tube (CRT).

The data recording and storage unit 106 hereafter referred to as the memory, can comprise any type of memory including random access memory (RAM), electronically erasable memory (EPROM), and the like. Further, the memory 106 can comprise any type of storage including magnetic or optical drives, a local drive or a network drive, and a floppy disk, hard drive, CD-ROM, DVD-ROM, DVD-RAM, a tape drive, and the like. The communication interface 110 can comprise any type of interface for connecting to a communication network, such as a data or voice network, a land-line or wireless network, and the like. It will be recognized that one of ordinary skill in the art would understand how to build a communication interface, and hence, further description of this interface is omitted.

Figure 3:
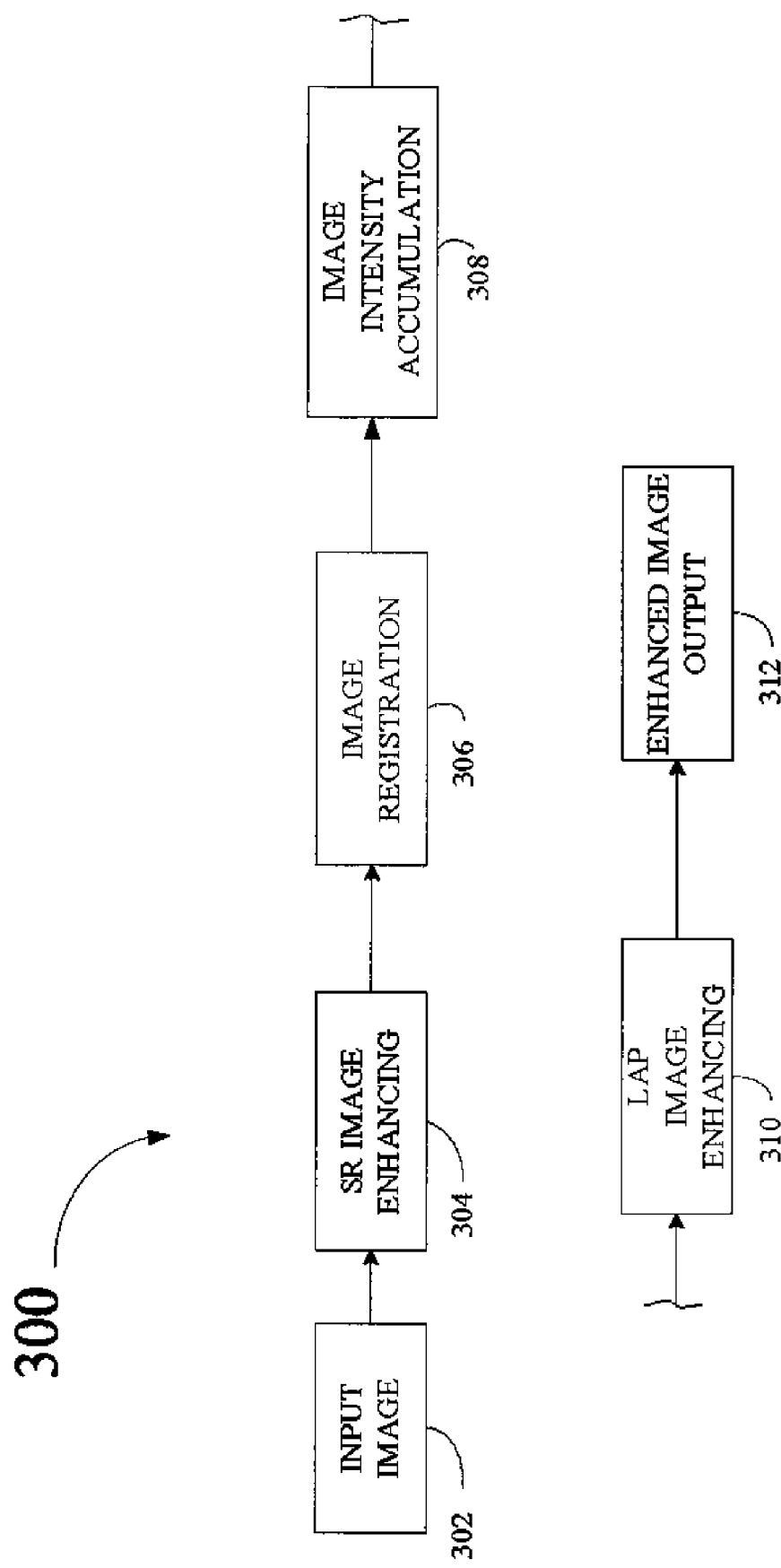
FIG. 3 is a block diagram illustrating a process for capturing and enhancing low intensity thermal or infrared images performed by the imaging system of FIG. 1 in accordance with the present invention.

Now referring to FIG. 3, a block diagram illustrating an exemplary process 300 for capturing and enhancing low intensity thermal or infrared images performed by the imaging system of FIG. 1 is shown. The process 300 is represented by a plurality of functional processing units or steps, provided in an exemplary identified order, that are executed by the processor 104. The illustrative processing units include an input unit 302, a super resolution (SR) enhancing unit 304, an image registering unit 306, an image intensity accumulation unit 308, a LAP unit 310, and an enhanced image output unit 312. The order of these processing units may of course be varied to the extent an output of one processing unit may not be required as an input of another processing unit. The processing units can be linked or coupled sequentially as shown, or alternatively a subset of these processing units can be run in parallel with another subset. A reduced or streamlined process might adopt fewer processing units, without impacting the intended functionality consistent with the present invention. It should be understood that various aspects of the present application may be used together as would occur to one of ordinary skill in the art without utilizing all of the processing units thereof. In addition, different combinations of these processing units might affect operational speed of the corresponding resulting processes and other intermediary processing outcomes. Accordingly, it should be apparent that other permutations of these processing units can be developed without departing from the spirit and scope of the present invention.

Initially, a set of instructions corresponding to this sequence of processing units is launched on the processor 104. This launching may be performed automatically with activation of the detector 102. The sequence of image frames 103a-103n may enter the imaging system 100 at the input unit 202 at real-time rates, nominally at about 30 frames, or a previously recorded suitable frame sequence is loaded from the memory 106. The images frames 103a-103n are subsequently provided to the SR unit 304.

As will be described in more detail below, in the super resolution process, the image frames 103a-103n which may have a low resolution, are registered and fused or composited to provide higher spatial resolution output image frames. The super resolved image frames are constructed through recovery of aliased information embedded in the lower resolution image frames 103a-103n. Because of the averaging nature of the SR process 304, a temporal noise in the image frames 103a-103n may be automatically decreased in the imaging system 100.

Figure 4:
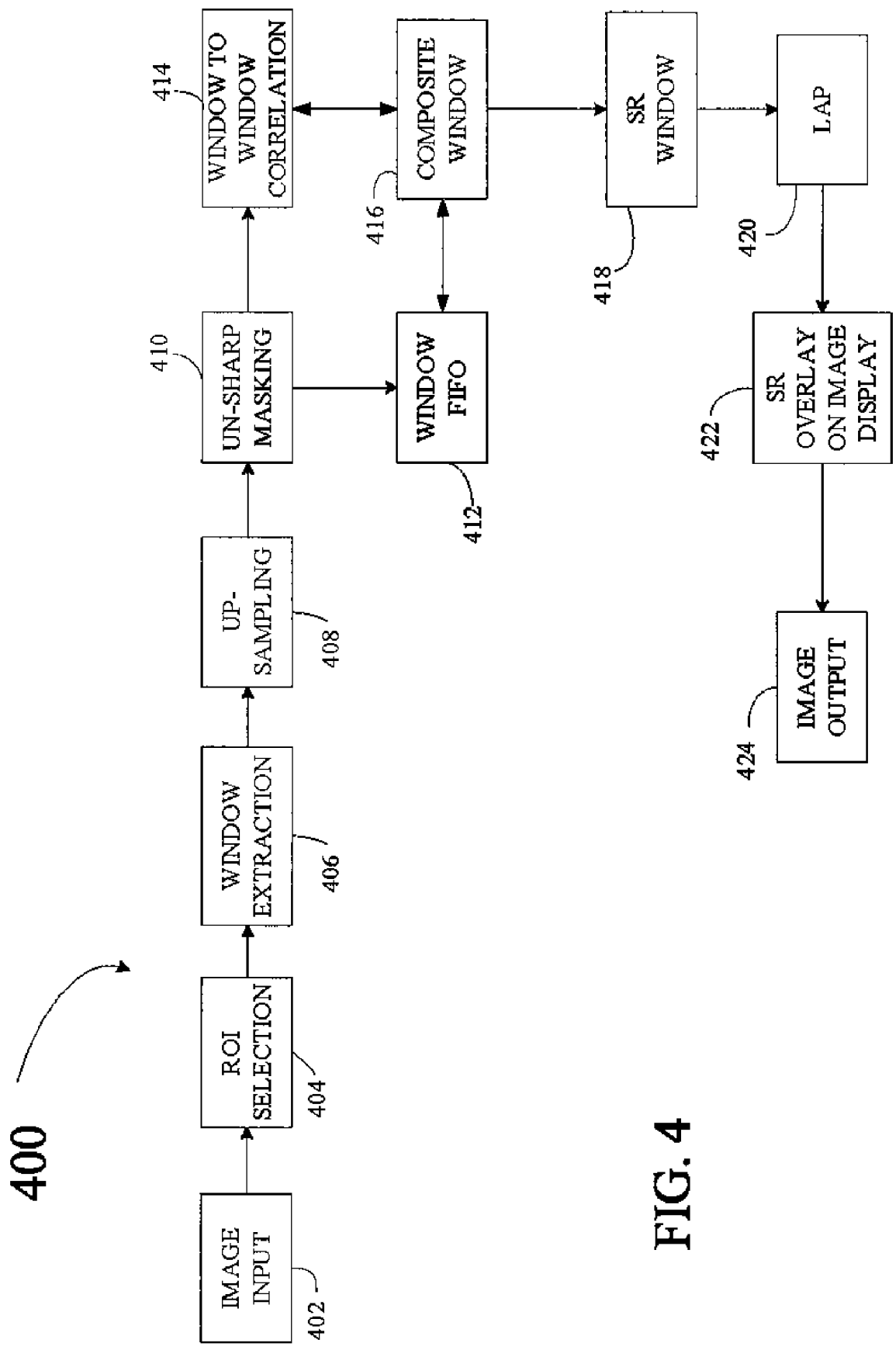
FIG. 4 is a block diagram of a super resolution (SR) process of FIG. 3 in accordance with the present invention.

Now referring to FIG. 4, a block diagram 400 illustrating the sub-processes of the SR process 304, performed by an image optimizer program of the processor 104, is shown. The SR process 304 is represented by a plurality of processing units, provided in an exemplary identified order, which includes an input module or unit 402, a region of interest (ROI) selecting unit 404, a window extracting unit 406, an up-sampling unit 408, an un-sharp masking unit 410, a "first in-first out" (FIFO) window organizing unit 412, a window to window correlating unit 414, a window compositing unit 416, a super resolution windowing unit 418, a LAP unit 420, an image frame overlaying unit 422, and an image frame output unit 424. The order of these SR processing units may of course be varied to the extent an output of one SR processing unit may not be required as an input of another SR processing unit. The SR processing units can be linked or coupled sequentially as shown, or alternatively a subset of these processing units can be run in parallel with another subset. A reduced or streamlined SR process 304 might adopt fewer SR processing units, without impacting the intended functionality of methods consistent with the present invention. The SR processing units will be discussed below in detail in conjunction with the discussion of the flow diagram 500 of FIG. 5 which illustrates the SR process 304 of FIG. 4 in more detail.

Figure 5:
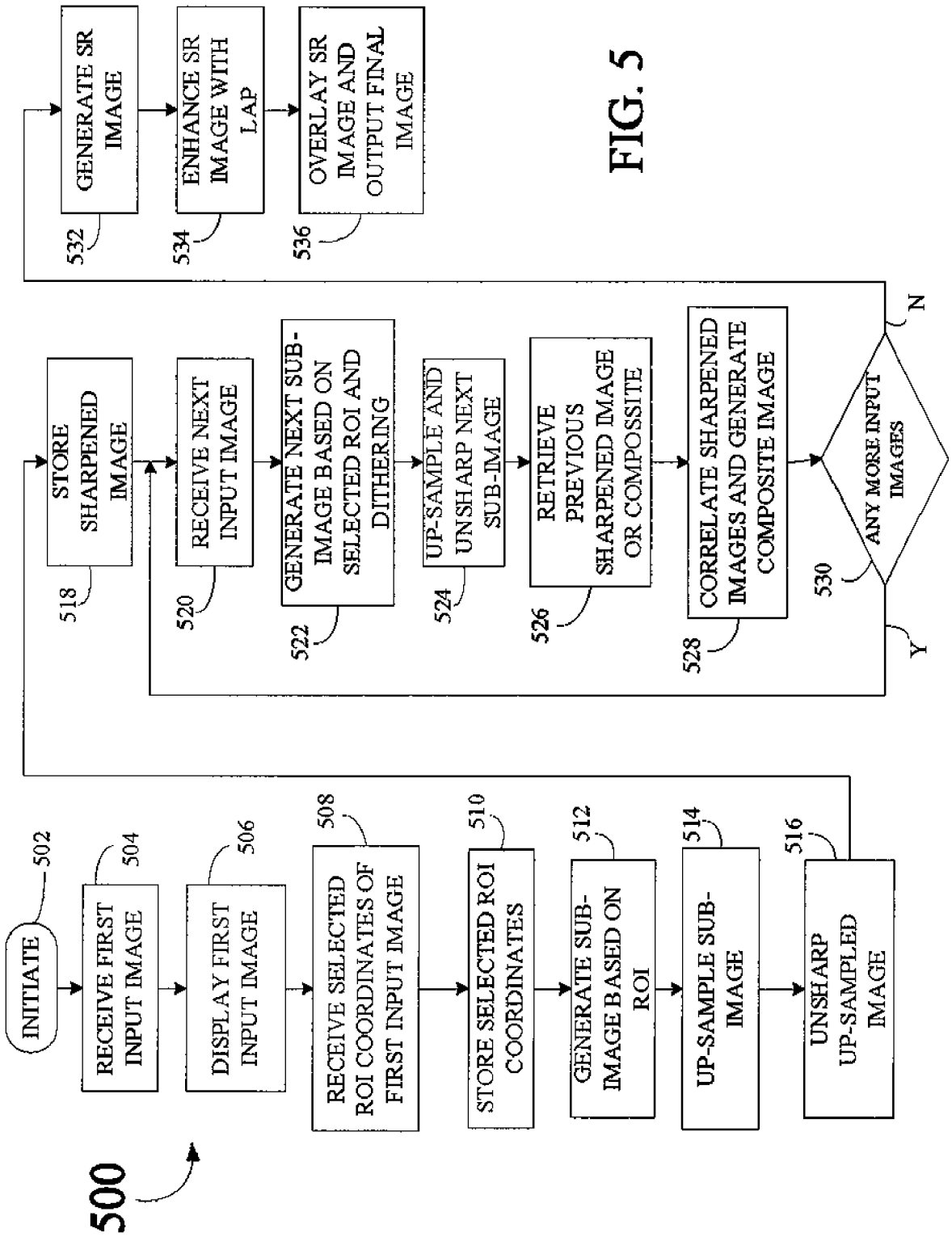
FIG. 5 is a flow diagram illustrating the SR process of FIG. 4.

In FIG. 5, the SR process 304 is initiated at step 502. The first image frame 103a, also referred to as the reference frame, is received from the image input unit 302, at step 504. The first image frame 103a heads the sequence of image frames 103a-103n, which may be captured by the detector 102 at real time rates, nominally about 30 frames per second (fps). Alternately, as stated above the sequence of image frames 103a-103n may be retrieved from the main memory 206 of the processor 104 or from the memory 106 as a previously stored sequence of image frames. At step 506, the received first image frame 103a may be communicated to and displayed by the display unit 108 if the user desires and can be stored unprocessed, if newly acquired, in the memory 106. Steps 504 and 506 correspond to the processing unit 402 in FIG. 4.

The image frames 103a-103n are dithered manually or automatically so as to have a suitable motion between each other. For the purpose of super-resolution, this suitable motion involves a non-integer pixel or sub-pixel shift (displacement). That is, each of the image frames 103a-103n is preferably slightly shifted from other temporally adjacent image frames. This image shifting motion leads successive image frames to contain different information from the same captured scene, which can be combined to obtain an alias-free (high-resolution) image. The images of successive frames may contain not only sub-pixel shifts but also integer pixel shifts. Typically the integer pixel shifts are first estimated, and then each subsequent frame to the first image frame 103a is realigned to determine its sub-pixel shift respect to the first image frame 103a.

Figure 6:
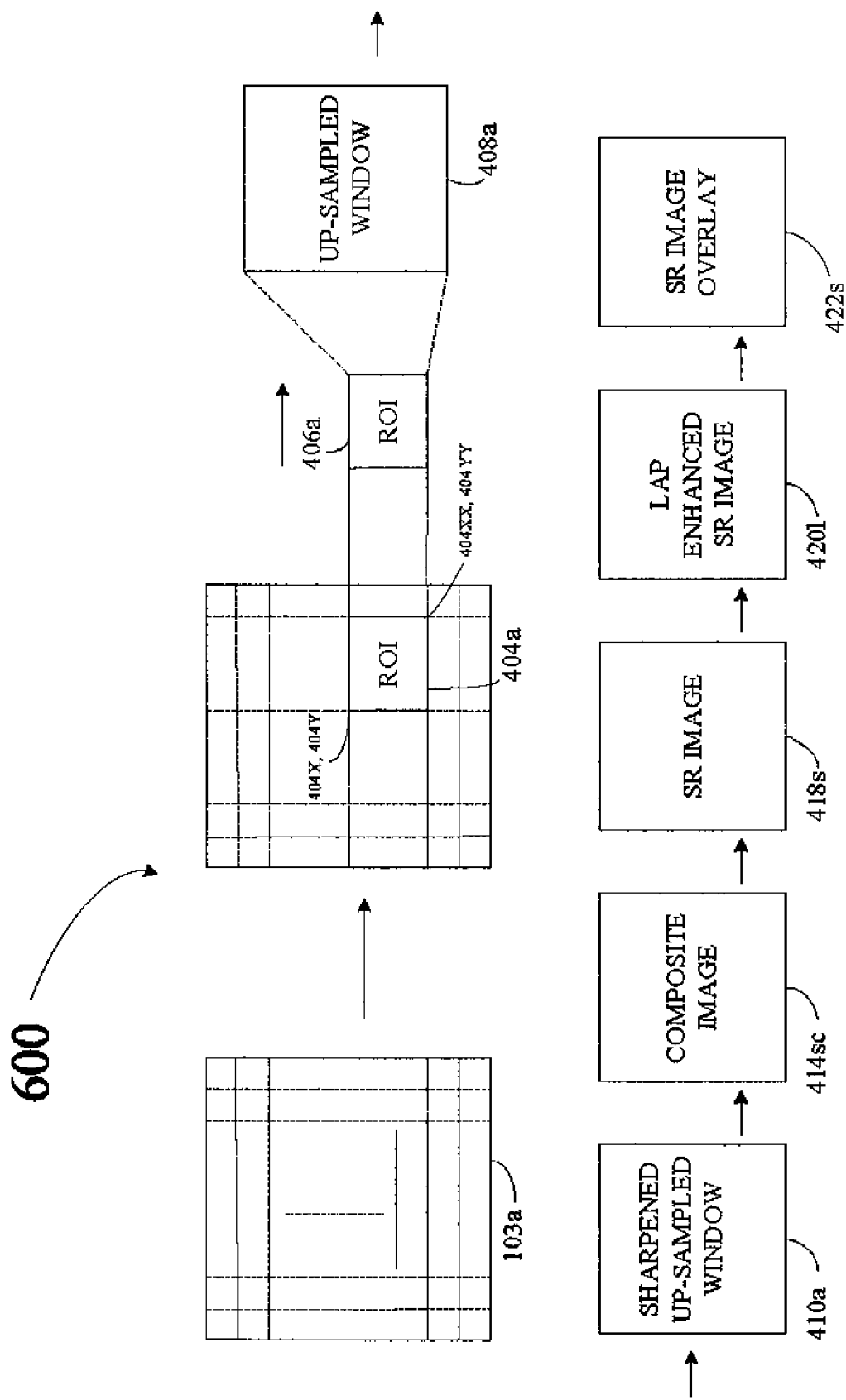
FIG. 6 is a block diagram illustrating an exemplary reference input image progressing through the SR process of FIG. 4.

At step 508, a region of interest (ROI) 404a, as shown in FIG. 6, of the first image frame 103a is determined or selected by the ROI selection unit 404. This ROI selection may be performed automatically by an auto-cueing based on a chosen image object or feature or manually by a pointing device based on a predetermined area of the captured scene. For ease of operation, a predetermined fixed window size is used, and the pointing device only needs to select the center of the window. The ROI coordinates 404x, 404y, 404xx and 404yy are then determined and stored in the memory 204, at step 510.

At step 512, based on the selected ROI 404a a sub-image 406a of the first image frame 103a is generated by the window extracting unit 406. The sub-image 406a may be a 64×64 image and corresponding sub-images 406b-406n are subsequently extracted from each of the subsequent image frames 103b-103n. These extracted sub-image 406a-406n may be the only pieces or parts of the image frames 103a-103n that are processed by the SR process 304. The remaining parts of the image frames 103a-103n are passed through the SR process 304 unmodified, and recombined with the processed sub-image 406a-406n at the end of the enhancement process. This recombination of these two complementary parts of image frames 103a-103n will be discussed in detail below.

At step 514, the two-dimensional sub-image 406a is up-sampled by the up-sampling unit 408 to become up-sampled image 408a which may be 4×4 larger in both dimensions. The up-sampling process may be performed, for example, via a nearest neighbor interpolation, a bilinear interpolation or via a bi-cubic interpolation. The bi-cubic interpolation is preferable because of the preservation of fine details, and the resulting bi-cubically up-sampled image 408a is generally smoother and has fewer interpolation distortion artifacts. Further, the bi-cubic interpolation minimizes the need for applying anti-aliasing techniques typically used to reduce or minimize undesirable distortion artifacts.

At step 516, the up-sampled image 408a is sharpened by a multi-resolution un-sharp masking unit 410 to derive a sharpened or enhanced up-sampled image 410a. The multi-resolution un-sharp process is a sharpening process used to emphasize edges and other high frequency components of the up-sampled image 408a, as well as differences between adjacent light and dark areas or spots. The multi-resolution un-sharp process typically involves employing filters to decompose the up-sampled image 408a into many frequency bands, attenuating low frequency bands, amplifying high frequency bands, and recombining modified spatial frequency bands.

At step 518, the sharpened up-sampled image 410a is stored in the "first in first out" (FIFO) window organizing unit 412. Subsequently, the next or second enhanced up-sampled image 410b is generated by processing the next input image frame 103b through steps 520 to 524 which are the same image processing steps discussed above in regard to the enhancing of the first image frame 103a, namely steps 504 to 516. As the name indicates, the FIFO window organizing unit 412 is configured to store a predetermined number of up-sampled images. As such, the FIFO window organizing unit 412 includes an image buffer queue. That is, when this predetermined number is reached, the oldest stored up-sampled image is discarded so as to add the newest up-sampled image, thereby maintaining the same predetermined number of stored up-sampled images.

As step 520, the second image frame 103b is received from the image input unit 302. At step 522, a sub-image 406b is generated or extracted from the image frame 103b based on the ROI 404a, its coordinates 404x, 404y, 404xx and 404yy, and an adjustment/shift that enables an appropriate alignment of the image frame 103a with the image frame 103b. Subsequently, at step 516, the sub-image 406b is up-sampled, to become up-sampled image 408b, and sharpened by the multi-resolution un-sharp masking unit 410 to derive a sharpened or enhanced up-sampled image 410b.

At step 526, the first enhanced up-sampled image 410a is retrieved to be correlated with the second enhanced up-sampled image 410b at step 528 by window-to-widow correlating unit 414. Generally, the correlation of two images involves correlating parts of one image with corresponding parts of another image, such as contours of an object. As such in this processing step 526, the first enhanced up-sampled image 410a is correlated with the second enhanced up-sampled image 410b by determining how to align them by translating one of them to the other. A composite image 414c is then generated from these two correlated first and second enhanced up-sampled images 410a and 410b, and stored in the composite window unit 416.

At step 530, a check is performed as to whether an additional input image frame is queued for processing. In the affirmative, a subsequent corresponding enhanced up-sampled image, say 410c to 410n, is individually correlated and combined with the latest composite image 414c. Otherwise, at step 532 the latest composite image is provided as a super-resolution image widow 418s by the super-resolution unit 418 to the LAP process unit 420.

As the resulting super-resolution image widow 418s may include parts that are undesirably light or dark, a LAP process may be utilized to develop desirable contrast and brightness of the pixels of these problematic parts, at step 534. The LAP unit 420 serves to improve image interpretability so as to allow an observer to see objects in the images that may otherwise be difficult or near impossible to assess in the original high-contrasted and high-brightened images, thereby extracting desirable details. Once balanced and sharpened by the LAP unit 420, the enhanced SR image 420*l* is overlaid on the reference image frame by the image frame overlaying unit 422, and output as a high resolution image 422*s* by the image frame output unit 424, at step 536.

Figure 7:
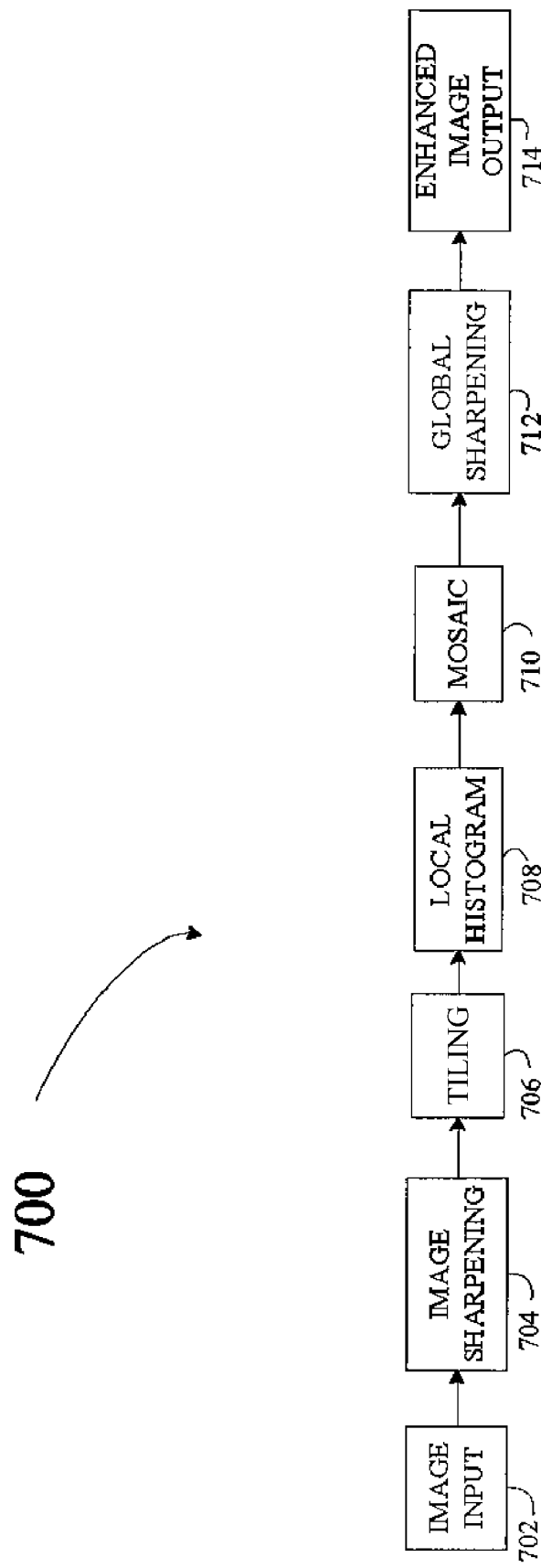
FIG. 7 is a flow diagram illustrating an exemplary embodiment of a local area process (LAP) performed by the image acquisition and processing unit of FIG. 1 in accordance with the present invention.

One exemplary embodiment of the LAP unit 420 is functionally represented by an algorithmic flow diagram illustrated in FIG. 7. The super-resolution image 418*s* is initially processed in a sharpening routine 704 which sharpens images, such as the multi-resolution un-sharp process discussed above. Next, a tiling routine 706 which involves breaking or dividing super-resolution image 418*s* into tiles, that may be for example about 20 to 80 pixels on a side of the tile. This tiling of images enables each tile to be processed or treated independently by predetermined subsequent processing units, such as the local histogram unit 708.

The local histogram process 708 enables an efficient redistribution of dynamic range of each of the tiles composing the super-resolution image 418*s*, which can achieve a maximum dynamic range for each tile. Next, a mosaic routine 710 is used to reassemble or bring back all tiles composing the super-resolution image 418*s* together. Finally, global sharpening is performed on the whole mosaic-regrouped super-resolution image 418*s* by the global image process 712 so as to achieve optimum image acuity.

Alternately, the tile-based LAP unit 420 may be a combination of the sharpening routine 704 and a local area contrast enhancement (LACE) routine or processing unit (not shown). The LACE routine may include histogram routine, a cumulative distribution function (CDF) routine, a local adaptation histogram routine and bi-linear or bi-cubic interpolation routine that utilizes look-up tables (LUT). That is, a desired histogram, or probability function (PDF), is defined and the cumulative distribution function (CDF) is found by integrating it. The image is then divided into equal size tiles defined or selected by the user. The histogram over a 3×3 tile region, for example, is then calculated. The LUT used for remapping and redistributing intensity values of the image pixels is generated for the center tile region. Finally, an interpolation, which may be bilinear or bi-cubic for example, is applied from the 3×3 neighborhood LUTs to eliminate any widowed boundary effects.

Now referring back to FIG. 3, once enhanced by the SR process 304 a sequence of super-resolution images 418*s* is registered by the image registration unit or process 306. As the sequence of super-resolution image 418*s* corresponds to input images acquired of the same scene or object 114 taken at successive times and potentially from different perspectives or angles, the same scene or object 114 may be in different coordinates within the super-resolution image 418*s*. The image registration process 306 involves a known algorithm that arranges or transforms the super-resolution image 418*s* into one coordinate system. The image registration process 306 may involve for example linear or non-linear transformations to map onto the first or reference super-resolution image of the sequence of super-resolution images 418*s* the subsequent images of the sequence. Further, the image registration process 306 may operate in the spatial domain that uses features, structures, and textures as matching criteria, or in the frequency domain that determines shifts between two images.

Once registered, the sequence of super-resolution image 418*s* is provided to the image intensity accumulating unit 308. Due to the one-to-one correlation between the pixels of each the registered images comprising the sequence of super-resolution image 418*s*, intensities of corresponding pixels are summed or integrated together. As such, the intensity of each pixel of the resulting image is the sum of intensities of all corresponding pixels. The resulting image may be further enhanced by the LAP enhancing unit 310 to improve image interpretability. This LAP enhancing unit 302 may be similar to the LAP unit 420, discussed above, or may only have a common subset of the processing units of the LAP unit 420. The final enhanced image is output or provided by the image output unit 312 to the display unit 108 or to the memory 106.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A method, comprising:
providing a processor;
collecting, using the processor, a plurality of low-intensity infrared images;
enhancing, using the processor, the plurality of low-intensity infrared images to produce a sequence of enhanced images;
registering, using the processor, the sequence of enhanced images;
accumulating, using the processor, the intensities of the registered sequence of enhanced images to produce a composite image;
enhancing, using the processor, the composite image; and
outputting, using the processor, the enhanced composite image,
wherein enhancing the plurality of low-intensity infrared images includes:
selecting a first subset of low-intensity infrared images from the plurality of low-intensity infrared images;
selecting a first low-intensity infrared image from the first subset of low-intensity infrared images;
determining a region of interest in the first low-intensity infrared image;
extracting a first window image from the first low-intensity infrared image which corresponds to the determined region of interest;
up-sampling and sharpening the extracted first window image;
selecting a second low-intensity infrared image from the first subset of low-intensity infrared images;
extracting a second window image based on the region of interest of the first low-intensity infrared image;
up-sampling and sharpening the extracted second window image;
generating a composite window based on the first and second extracted window images;
enhancing the generated composite window; and
combining the enhanced composite window with the selected first low-intensity infrared image.

2. The method of claim 1, wherein registering the sequence of enhanced images comprises:
selecting a reference image from the sequence of enhanced images;
determining pixel shifts between the reference image and each of remaining images of the sequence of enhanced images; and
mapping the remaining images of the sequence of enhanced images onto the reference image based on the pixel shifts.

3. The method of claim 1, wherein enhancing the composite image comprises:
reducing noise in the composite image via local area processing to improve image interpretability for an observer of the composite image.

4. A non-transitory computer-readable medium storing instructions that, when executed, cause a computer to:
collect a plurality of low-intensity infrared images;
enhance each of the plurality of low-intensity infrared images to produce a sequence of enhanced images;
register the sequence of enhanced images;
accumulate the intensities of the registered sequence of enhanced images to produce a composite image;
enhance the composite image; and
output the enhanced composite image,
wherein enhancing each of the plurality of low-intensity infrared images includes:
selecting a first subset of low-intensity infrared images from the plurality of low-intensity infrared images;
selecting a first low-intensity infrared image from the first subset of low-intensity infrared images;
determining a region of interest in the first low-intensity infrared image;
extracting a first window image from the first low-intensity infrared image which corresponds to the determined region of interest;
up-sampling and sharpening the extracted first window image;
selecting a second low-intensity infrared image from the first subset of low-intensity infrared images;
extracting a second window image based on the region of interest of the first low-intensity infrared image;
up-sampling and sharpening the extracted second window image;
generating a composite window based on the first and second extracted window images;
enhancing the generated composite window; and
combining the enhanced composite window with the selected first low-intensity infrared image.

5. The non-transitory computer-readable medium of claim 4, wherein registering the sequence of enhanced images comprises:
selecting a reference image from the sequence of enhanced images;
determining pixel shifts between the reference image and each of remaining images of the sequence of enhanced images; and
mapping the remaining images of the sequence of enhanced images onto the reference image based on the pixel shifts.

6. The non-transitory computer-readable medium of claim 4, wherein enhancing the composite image comprises:
reducing noise in the composite image via local area processing to improve image interpretability for an observer of the composite image.

7. An apparatus, comprising:
an image detection unit; and
an image acquisition unit in communication with the image detection unit, the image acquisition unit comprising a processor and memory storing instructions that, when executed by the processor, cause the image acquisition unit to:
collect a plurality of low-intensity infrared images;
enhance each of the plurality of low-intensity infrared images to produce a sequence of enhanced images;
register the sequence of enhanced images;
accumulate the intensities of the registered sequence of enhanced images to produce a composite image;
enhance the composite image; and
output the enhanced composite image,
wherein enhancing each of the plurality of low-intensity infrared images includes:
selecting a first subset of low-intensity infrared images from the plurality of low-intensity infrared images;
selecting a first low-intensity infrared image from the first subset of low-intensity infrared images;
determining a region of interest in the first low-intensity infrared image;
extracting a first window image from the first low-intensity infrared image which corresponds to the determined region of interest;
up-sampling and sharpening the extracted first window image;
selecting a second low-intensity infrared image from the first subset of low-intensity infrared images;
extracting a second window image based on the region of interest of the first low-intensity infrared image;
up-sampling and sharpening the extracted second window image;
generating a composite window based on the first and second extracted window images;
enhancing the generated composite window; and
combining the enhanced composite window with the selected first low-intensity infrared image.

8. The apparatus of claim 7, wherein registering the sequence of enhanced images comprises:
selecting a reference image from the sequence of enhanced images;
determining pixel shifts between the reference image and each of remaining images of the sequence of enhanced images; and
mapping the remaining images of the sequence of enhanced images onto the reference image based on the pixel shifts.

9. The apparatus of claim 7, wherein enhancing the composite image comprises:
reducing noise in the composite image via local area processing to improve image interpretability for an observer of the composite image.

10. The apparatus of claim 7, further comprising a data recording and storage unit.

11. The apparatus of claim 7, further comprising a display unit.

12. The apparatus of claim 7, further comprising a communication interface unit.

13. A method, comprising:
providing a processor;
collecting, using the processor, a plurality of low-intensity infrared images;
enhancing, using the processor, the plurality of low-intensity infrared images to produce a sequence of enhanced images;
registering, using the processor, the sequence of enhanced images;
accumulating, using the processor, the intensities of the registered sequence of enhanced images to produce a composite image;
enhancing, using the processor, the composite image; and
outputting, using the processor, the enhanced composite image, wherein registering the sequence of enhanced images comprises:
  selecting a reference image from the sequence of enhanced images;
  determining pixel shifts between the reference image and each of remaining images of the sequence of enhanced images; and
  mapping the remaining images of the sequence of enhanced images onto the reference image based on the pixel shifts.

14. The method of claim 13, wherein enhancing the composite image comprises reducing noise in the composite image via local area processing to improve image interpretability for an observer of the composite image.

15. A non-transitory computer-readable medium storing instructions that, when executed, cause a computer to:
  collect a plurality of low-intensity infrared images;
  enhance each of the plurality of low-intensity infrared images to produce a sequence of enhanced images;
  register the sequence of enhanced images;
  accumulate the intensities of the registered sequence of enhanced images to produce a composite image;
  enhance the composite image; and
  output the enhanced composite image,
  wherein registering the sequence of enhanced images comprises:
    selecting a reference image from the sequence of enhanced images;
    determining pixel shifts between the reference image and each of remaining images of the sequence of enhanced images; and
    mapping the remaining images of the sequence of enhanced images onto the reference image based on the pixel shifts.

16. The non-transitory computer-readable medium of claim 15, wherein enhancing the composite image comprises reducing noise in the composite image via local area processing to improve image interpretability for an observer of the composite image.

17. An apparatus, comprising:
an image detection unit; and
an image acquisition unit in communication with the image detection unit, the image acquisition unit comprising a processor and memory storing instructions that, when executed by the processor, cause the image acquisition unit to:
  collect a plurality of low-intensity infrared images;
  enhance each of the plurality of low-intensity infrared images to produce a sequence of enhanced images;
  register the sequence of enhanced images;
  accumulate the intensities of the registered sequence of enhanced images to produce a composite image;
  enhance the composite image; and
  output the enhanced composite image,
  wherein registering the sequence of enhanced images comprises:
    selecting a reference image from the sequence of enhanced images;
    determining pixel shifts between the reference image and each of remaining images of the sequence of enhanced images; and
    mapping the remaining images of the sequence of enhanced images onto the reference image based on the pixel shifts.

18. The apparatus of claim 17, wherein enhancing the composite image comprises reducing noise in the composite image via local area processing to improve image interpretability for an observer of the composite image.

19. The apparatus of claim 17, further comprising a data recording and storage unit.

20. The apparatus of claim 17, further comprising a display unit.

21. The apparatus of claim 17, further comprising a communication interface unit.

* * * * *